(12) United States Patent
Sakai

(10) Patent No.: US 6,471,900 B1
(45) Date of Patent: Oct. 29, 2002

(54) METHOD FOR FABRICATING A CONNECTOR FOR AN ELECTRONIC CIRCUIT BY TERMINAL INSERT MOLDING

(75) Inventor: Keisuke Sakai, Tokyo (JP)

(73) Assignee: Meioukasei Co., Ltd., Tokyo (JP)

( * ) Notice: Subject to any disclaimer, the term of this patent is extended or adjusted under 35 U.S.C. 154(b) by 133 days.

(21) Appl. No.: 09/595,819

(22) Filed: Jun. 16, 2000

(51) Int. Cl.[7] .................. B29C 45/14; B29C 70/84; B29C 70/72
(52) U.S. Cl. ............... 264/263; 264/272.11; 264/277; 29/876
(58) Field of Search ............... 264/250, 255, 264/263, 275, 277, 157, 138; 174/50.52, 50.53, 255; 29/825, 876

(56) References Cited

U.S. PATENT DOCUMENTS

| | | | |
|---|---|---|---|
| 4,337,574 A | * 7/1982 | Hughes et al. ........... | 29/883 |
| 5,274,918 A | * 1/1994 | Reed ....................... | 29/882 |
| 5,527,502 A | * 6/1996 | Kiuchi et al. ............ | 264/250 |
| 5,843,359 A | * 12/1998 | Kudo et al. .............. | 264/263 |
| 6,019,928 A | * 2/2000 | Fujitani et al. .......... | 264/263 |
| 6,045,739 A | * 4/2000 | Abe ........................ | 264/277 |
| 6,048,482 A | * 4/2000 | Lemke et al. ........... | 264/251 |
| 6,187,242 B1 | * 2/2001 | Onoda .................... | 264/255 |
| 6,287,502 B1 | * 9/2001 | Onoda .................... | 264/263 |

\* cited by examiner

*Primary Examiner*—Angela Ortiz
(74) *Attorney, Agent, or Firm*—Flynn, Thiel, Boutell & Tanis, P.C.

(57) ABSTRACT

In order to provide continuous insert molding for a small size multi-pin connector, each terminal to be used for insert molding is linked with a terminal carrier of a hoop through linking portions having a small width disposed in a part of an end surface thereof. Slots formed in a stripper plate receive the terminal carriers. After closing a cavity with a parting plane of the stripper plate, in which openings of the slots are filled by end surfaces of the-terminal carriers, a terminal table, in which the terminals are buried, is formed by insert molding. The terminal carriers are bent repeatedly around the linking portions. Due to plastic deformation, the terminal carriers are separated from the terminals by fracture of the linking portions. Thus, the terminals are independent from the terminal carriers and electrically isolated from each other. In this way, a multi-pin connector is formed.

16 Claims, 6 Drawing Sheets

METHOD FOR FABRICATING A CONNECTOR FOR AN ELECTRONIC CIRCUIT BY TERMINAL INSERT MOLDING

FIELD OF THE INVENTION

The present invention relates to a connector used for connecting circuits with each other in an electronic apparatus, and more concretely speaking, to a method for fabricating a multi-pin connector by terminal insert molding, in which a plurality of terminal rows, each row including a number of pin-shaped terminals, are juxtaposed closely to each other.

DESCRIPTION OF THE PRIOR ART

Recently down-sizing of electronic apparatuses such as OA apparatuses, AV apparatuses, communication apparatuses, personal computers, etc. advances and it is a matter of course that down-sizing and increase in number of pins (terminals) are required for a connector connecting different independent parts such as driving sections, memories, in/output sections, interfaces, displays, etc. therein. In order to deal with troubles taking place in the circuits, they are divided into several zones so that only troubled parts of the circuits can be exchanged, these zones being connected through connectors. In this way, it is possible to improve production yield by means for preventing influences of the troubles in a part on the whole of the apparatus. Consequently a small size connector is required, in which a number of pins (terminals) capable of dealing with such circuits are closely arranged, e.g. there are 24 pins arranged with a pitch smaller than 2.5 mm in parallel rows, which are arranged with an interval smaller than 0.8 mm.

As means for arranging closely a number of terminals in such a small region, terminal insert molding is applied thereto by injection molding using mold resin material such as engineering plastic, etc. However different terminals implanted in a connector by insert molding should be electrically independent from each other. For this purpose honeycomb-shaped dies of high precision are required, in which partition walls are disposed, which can hold a number of independent fine pins (terminals) separately from each other in predetermined positions close to each other. However such dies are expensive and much work is required for inserting the number of fine pins (terminals) independently into holes formed by the partition walls. Even if an automatic mounting machine is used therefor, increase in equipment investment and running cost is inevitable.

On the other hand, a thin terminal table die is simple, by which a plurality of terminals arranged in parallel with a small interval are formed by forward transfer press and extending perpendicularly from a terminal carrier and only a plurality of terminals included in a transversal hoop, whose plate surface is disposed transversally along a parting plane of the thin terminal table die, are inserted into a cavity in the die for a thin terminal table to be formed. By means thereof it is easy to effect the formation efficiently with a low cost. Consequently it is usual that a plurality of such one-row terminal tables are superposed on each other to bring them together in one socket in order to construct a multi-pin connector of one body.

However, although the die is simplified and insertion of terminals is easy for the multi-layered multi-pin connector, it requires mounting work and suitable linking members. The different linking members and a socket for bringing the linking members together hinders the down-sizing. Further, if a zigzag terminal arrangement is included in order to secure insulation between the different terminals in a small space, fabrication steps are complicated. Therefore, it is difficult to say that superposition of one-row terminals is always the best approach. For this reason, it is desirable to arrange a plurality of hoops, each having a plurality of terminals formed by forward transfer press, with a small interval in parallel so that surfaces thereof are parallel to each other. This allows simultaneous insertion of a plurality of rows into the cavity in the terminal table die to effect terminal insert molding.

However, in order to support the hoops, to lead the terminals formed in hoops, and to shut closely the cavity in a lower side die by a stripper plate of an upper side die effecting the terminal insert molding, insert holes should be formed in the stripper plate so that different terminals juxtaposed on one hoop and separated by a predetermined small distance are isolated from each other. In this way, it is inevitable that the stripper plate has a construction, which is as complicated and expensive as the insert die using terminals separated from each other, described above.

An object of the present invention is to provide a method for fabricating a multi-pin connector having a small size and a high precision. The method utilizes terminal insert molding by means of simple dies by making hoops formed by a forward transfer press cooperate with a stripper plate.

In order to achieve the above object, a method for fabricating a connector for an electronic circuit by terminal, insert molding according to the present invention is one, by which a plurality of terminals are inserted simultaneously in a vertical direction through an opening in an upper surface into a cavity in a connector terminal table die. Each of band-shaped conductive thin plates is provided with a terminal carrier, which is cut away after the insert molding along its longitudinal direction, and a plurality of terminals extending in a direction perpendicular to a side of the terminal carrier therefrom and arranged in parallel to each other with a predetermined interval.

Slots engraved in a parting plane of the stripper plate have a width that is slightly greater than the thickness of the thin plates so that the plates are closely engaged with the slots. The terminals juxtaposed on the band-shaped conductive thin plates are positioned perpendicular to the upper surface of the, cavity. The terminal side end surface of the terminal carriers is aligned with the open ends of the slots on the parting plane. In this way, the open ends of the slots are completely filled by the terminal carriers. The parting plane is a flat continuous surface so that the cavity is shut closely by the parting plane.

Further the plurality of terminals are linked with the terminal side end surface of the terminal carrier through means, which can be easily broken by forced plastic deformation by bending so that the terminals are separated from the terminal carrier. The terminal carrier and the terminals are cut away from each other after the insert molding of the terminals so that the plurality of terminals, which were linked with each other through the end surface of the terminal carrier, are made independent from each other.

The plurality of slots are engraved in the stripper plate and the plurality of band-shaped conductive thin plates are arranged so that the width direction of the plate surfaces is vertical and that they are parallel to each other with a predetermined interval. In this way the slots can be charged with the terminal carriers in parallel. In addition, the band-shaped conductive thin plates arranged in parallel are located so that terminals of a plate are shifted with respect to corresponding terminals of another plate adjacent thereto by a predetermined distance in the longitudinal direction. In this way a terminal arrangement in zigzag in a transversal direction can be formed. Further it is desirable to form positioning holes in a terminal carrier part of each of the band-shaped conductive thin plates.

Each of the band-shaped conductive thin plates is 0.1 to 0.3 mm thick and as the means easily broken the width of linking portions linking each of the terminals on both the sides with a terminal side end surface of the terminal carrier is kept below 0.1 mm. A width of the linking portions is preferably 0.06 mm. For each of the band-shaped conductive thin plates a hoop is used, in which the plurality of terminals are formed by forward transfer continuous press.

The opening is shut closely by the stripper plate or metal die (hereinbelow, called simply die plate) during simultaneous insert molding of the plurality of terminals effected through the opening formed in the upper surface of the cavity in the connector terminal table die, using a plurality of longitudinal hoops, the width direction of plate surfaces of which stands vertically. A plurality of slots are engraved in the parting plane of the die plate for guiding terminal carriers, each of which is obtained by forming a plurality of terminals successively on a hoop by, forward transfer continuous press. A part of the parting plane removed by engraving the plurality of slots is filled with end surfaces in the thickness direction of the terminal carriers.

The opening in the upper surface of the cavity is shut closely during the insert molding by the parting plane complemented by the end surfaces in the thickness direction of the terminal carriers in order to prevent outflow of the resin. The terminal-carriers are removed after the insert molding so that the different terminals are isolated from each other. Two extremities of each of the slots in the longitudinal direction are opened so that the terminal carriers of the hoops can be passed continuously through the slots in the longitudinal direction, sliding therein.

DESCRIPTION OF THE PREFERRED EMBODIMENTS

Figure 1:
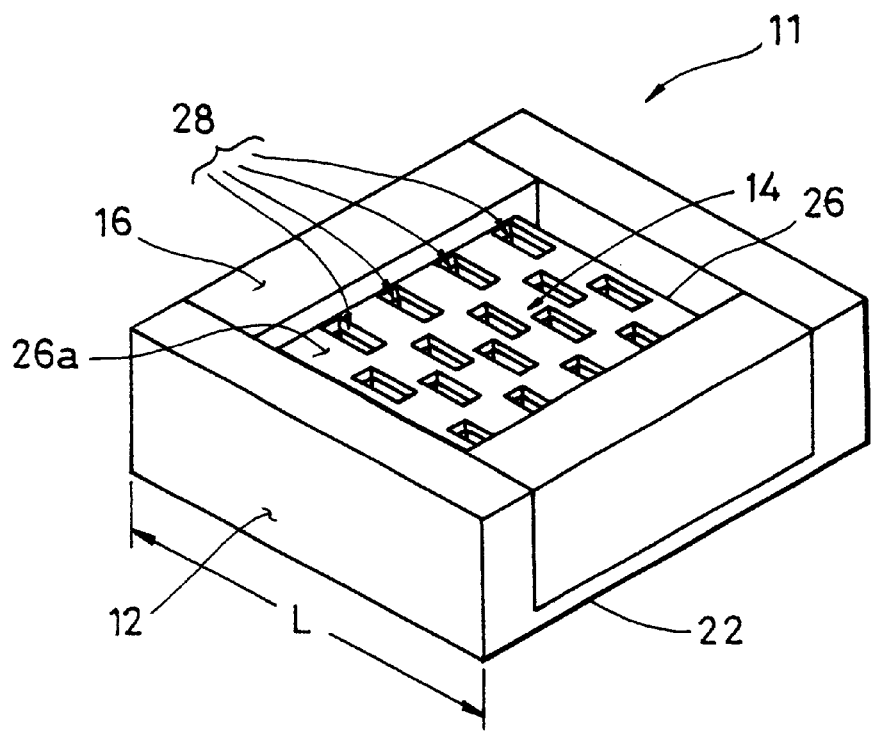
FIG. 1 is a perspective view of a whole lower side die used for realizing the method for fabricating a connector by terminal insert molding according to the present invention.
Figure 2:
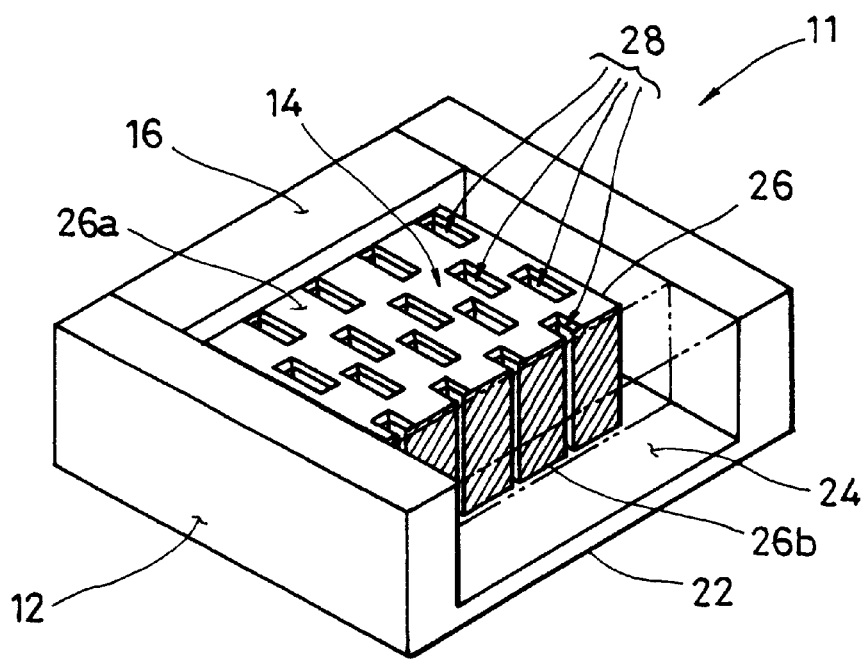
FIG. 2 is a perspective view of the lower side die indicated in FIG. 1, a part thereof being cut apart so that the interior thereof can be seen.

As a mode of realization of the present invention, a method for fabricating a connector for an electronic circuit by terminal insert molding will be explained below on the basis of drawings representing an embodiment. FIG. 1 is a perspective view of a lower side die 11 for forming a connector terminal table 10 (cf. FIG. 5). FIG. 2 is a partial perspective view of the lower side die 11, similar to FIG. 1, in which a part indicated by alternate long and two short dashes lines is cut apart in order that the interior can be better understood. Reference numeral 12 defines side surfaces of a cavity 14. A flat and smooth upper surface 16 is shut closely by a parting plate 20 of a stripper plate 18 as shown in FIGS. 3 and 4.

Figure 5:
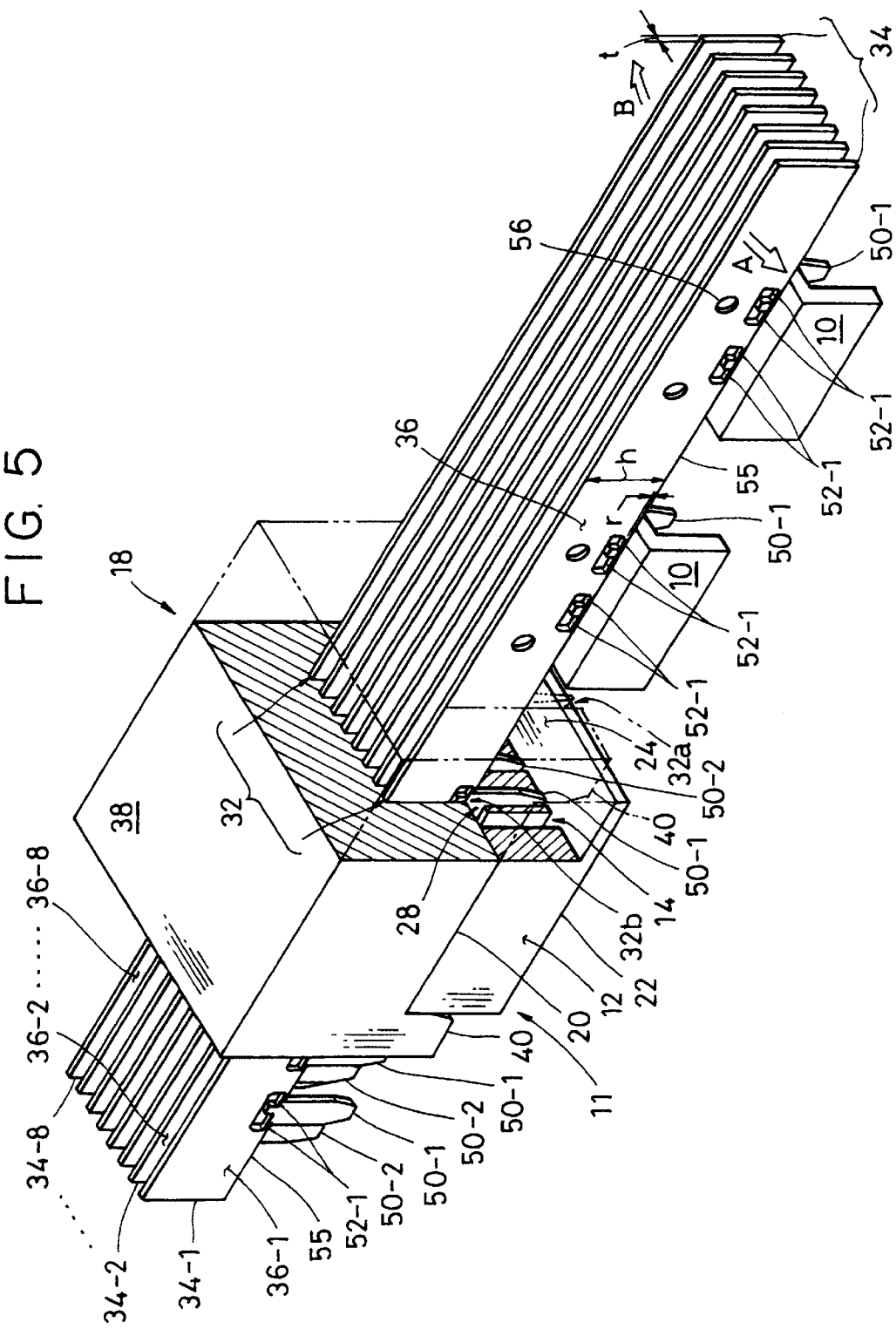
FIG. 5 is a diagram for explaining the method for fabricating a connector by terminal insert molding according to the present invention.

The upper surface 16 is formed so as to be parallel to a lower surface 22, which is mounted on a die mounting plate of an injection molding machine not shown in the figures. Further, the lower side die 11 has a bottom surface 24 parallel to the upper surface 16, which defines a bottom of the cavity 14. A core 26 is secured to the bottom surface 24. The terminal insert holes 28 passing through from an upper surface 26a to a lower surface 26b are formed according to arrangement of terminals 50 as shown in FIG. 5 and receive the terminals 50 closely engaged therewith. The peripheral edge of the upper opening of each of the terminal insert holes 28 is chamfered in order to make insertion of the terminals 50-1, 50-2 easier.

The upper surface 16 is formed so as to be parallel to a lower surface 22, which is mounted on a die mounting plate of an injection molding machine not shown in the figures. Further, the lower side die 11 has a bottom surface 24 parallel to the upper surface 16, which defines a bottom of the cavity 14. A core 26 is secured to the bottom surface 24. The terminal insert holes 28 passing through from an upper surface 26a to a lower surface 26b are formed according to arrangement of terminals 50 as shown in FIG. 5 and receive the terminals 50 closely engaged therewith. The peripheral edge of the upper opening of each of the terminal insert holes 28 is chamfered in order to make insertion of the terminals 50-1, 50-2 easier.

Figure 3:
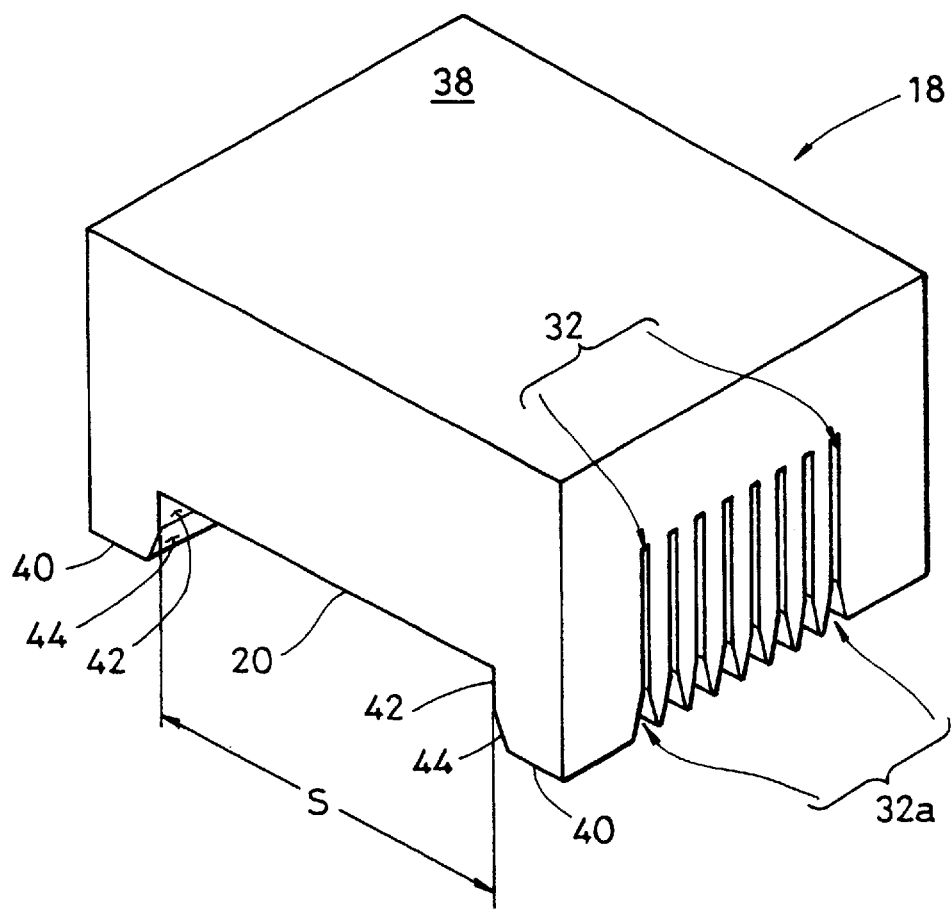
FIG. 3 is a perspective view of a whole stripper plate serving as an-upper side die for realizing the method for fabricating a connector by terminal insert molding according to the present invention.
Figure 4:
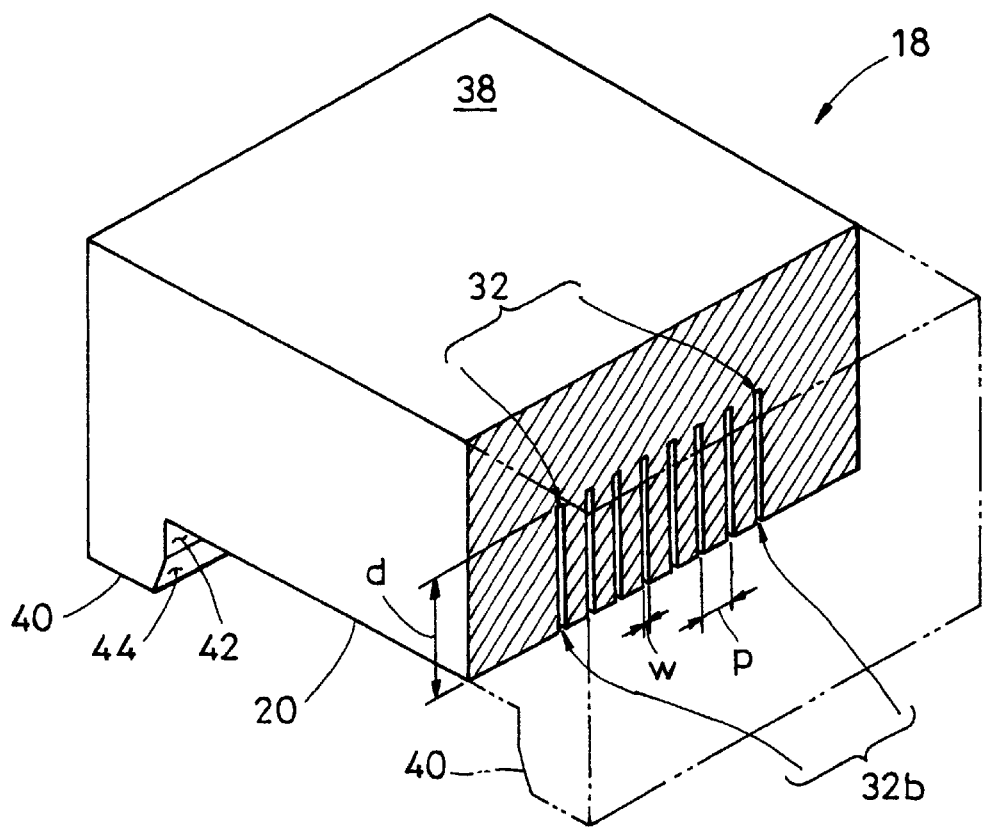
FIG. 4 is a perspective view of the stripper plate indicated in FIG. 3, a part thereof being cut apart so that the interior thereof can be seen.

FIG. 3 is a perspective view of an appearance of the whole stripper plate 18, which is the upper side die, and in a similar perspective view of the stripper plate 18 indicated in FIG. 4 a part (part enclosed by alternate long and two short dashes lines) is cut apart so that the interior can be seen. Eight slots 32 are formed with an equal interval in the stripper plate 18 in the present embodiment indicated in FIGS. 3 and 4. The width w of each of the slots is determined so that each hoop 34 (cf. FIG. 5) having a thickness t can be closely engaged therewith, e.g. at 0.2 mm, and the equal interval, pitch p, is e.g. 0.8 mm. Further the depth d of the slots 32 is equal to the width h of the terminal carriers 36.

The parting plane 20 of the stripper plate 18 is parallel to the upper surface 38. The length S thereof in the forward transfer direction of the slots 32 is limited by side walls 42 of blocks 40 protruding in the front part and the rear part of the stripper plate 18 and in the transversal direction it is freely opened. The length S limited by the side walls 42 is almost equal to the length L of the corresponding side edge of the lower side die 11 and the former is slightly larger than the latter so that the former can be closely engaged with the latter.

The lower side die 11 is received easily owing to slopes 44 formed so that the distance between the side walls 42 becomes greater towards the opened end. In this way, the stripper plate 18 can shut closely the cavity 14 by introducing the lower side die 11 along the side walls 42 through the slopes 44 so that the parting plane 20 is closely in contact with the upper surface 16 of the lower side die 11. Further, in FIG. 3, opened ends 32a at the lower extremity of the slots 32 are widened in the part, where they are in the blocks 40 so that the hoops 34 can be easily inserted thereinto. On the other hand, there are no slopes at end parts 32b of the slots 32 opened at the parting plane 20 (cf. FIG. 4) so that there are no steps between terminal side end surfaces 55 of the buried terminal carriers 36 and the parting surface 20. Geometrical shapes, etc. of the eight slots 32, the stripper plate 18, etc. do not restrict the present invention.

In the embodiment indicated in FIG. 5, the thickness t of each of the hoops 34 engaged with the eight slots 32 in the stripper plate 18 is e.g. 0.2 mm and terminals 50 are formed in a same arrangement and in a same shape by forward transfer continuous press. Explanation will be made for the hoop 34-1, which is at the extreme left end in the figure, as a representative of the hoops 34. Terminals 50-1 used for the terminal insert molding are held as a continuous body by forming linking portions 52-1 having a small width r on both the sides of each of the terminals 50-1 at a part of the terminal side end surface 55 of each of the terminal carriers 36-1 extending continuously in the longitudinal direction of the hoop 34-1 so that each of-the terminals 50-1 is linked with the terminal carrier 36-1. Explanation will be omitted for the other hoops 34, because they have a form identical thereto.

When the hoops 34 are engaged with the slots 32 in the stripper plate 18, the terminals 50-1 protrude from the parting plane 20 of the slots 32. Part of the opened end 32a of each of the slots 32, other than the protruding terminal, is covered by the terminal side end surface 55 of the terminal carrier 36-1 constituting the linking portions 52-1 of the terminal 50-1. Therefore, the slot 32 exposes no recess portion to the cavity 14. The parting surface 20 is kept flat apart from the area where the terminals 50-1 protrude. The width r of the linking portions 52-1 varies depending on the thickness t of the hoop. However, it is known experimentally that a width r of 0.06 mm is suitable when the thickness t is 0.2 mm.

Figure 8:
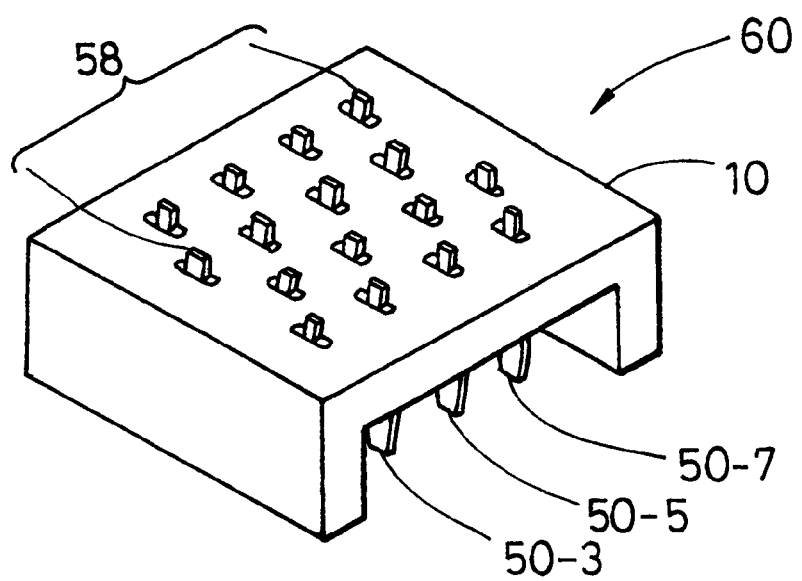
FIG. 8 is a perspective view of a whole multi-pin connector fabricated by the method for fabricating a connector by terminal insert molding according to the present invention.

Now a method for fabricating a multi-pin connector 60 indicated in FIG. 8 will be explained. The lower side die 11 is mounted on a fixed die mounting plate of an injection molding machine not indicated in the figure. On the other hand the stripper plate 18 is mounted on a movable die mounting plate of the injection molding machine not indicated in the figure and the hoops 34-1 to 34-8 are inserted into the slots 32 in the stripper plate 18. At this time, positioning holes formed in the terminal carrier 36 of each of the hoops 34 are positioned so that arrangement of the terminals 50 is in accordance with arrangement of the terminal insert holes 28 formed in the core 26.

Figure 6:
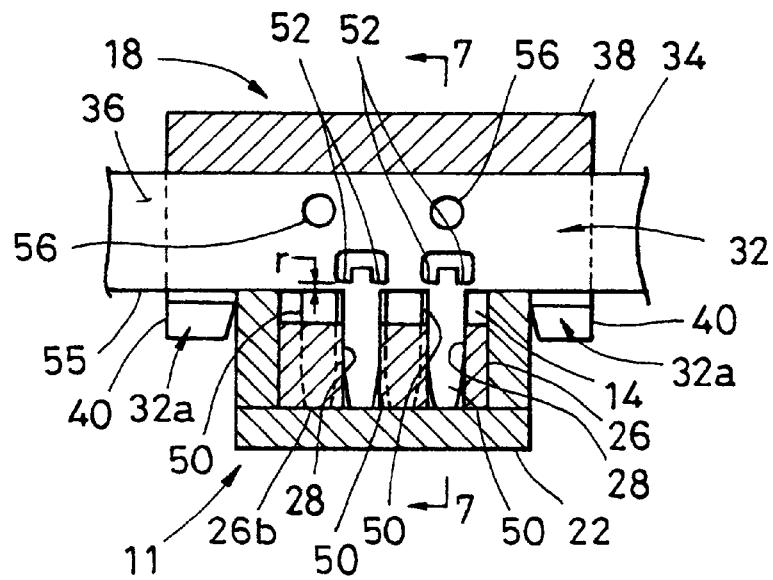
FIG. 6 is a cross-sectional view viewed in a direction perpendicular to a forward transfer direction indicating a relation among the upper and lower dies and hoops during molding by the method for fabricating a connector by terminal insert molding according to the present invention.

In the present embodiment, as shown in FIG. 6, hoops adjacent to each other (odd and even supplementary numbers in reference numerals) are inverse in the arrangement direction. Positioning holes 56 are adjusted so that a row of terminals 50-1 of the hoop 34-1, which is at the extreme left end, is shifted from a row of terminals 50-2 of the hoop 34-2, which is adjacent thereto, by a ½ pitch. The positioning holes 56 are determined so that terminals 50 are arranged transversely in a zigzag form. If the hoops 34 are arranged in a same direction, since terminals 50 are arranged naturally on straight lines both longitudinally and transversely, arrangement of terminal insert holes 28 formed in the core 26 in the lower side die 11 are changed to correspond thereto.

Figure 7:
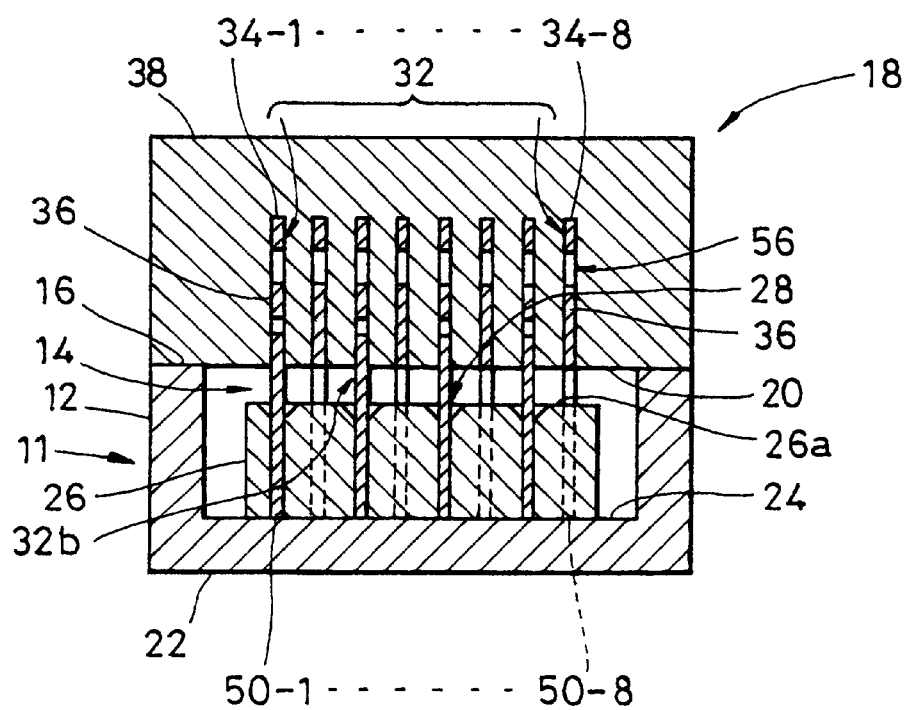
FIG. 7 is a cross-sectional view thereof along a line 7—7 in FIG. 6.

The parting plane 20 of the stripper plate 18 receives hoops 34-1 to 34-8 and by known means is brought into contact with the upper surface 14 of the lower side die 11. Then resin material having a high electrically isolating property, such as engineering plastic, etc., is injected through a gate (not shown) into the tightly closed cavity 14 shown in FIG. 7. The resin material forms a terminal table 10 together with the terminals 50 inserted into the terminal insert holes 28 in the core 26. The terminals 50 are inserted into the terminal table 10. The terminal table 10 is a product made of engineering plastic :and is removed from the lower side die 11 after lifting of the stripper plate 18 of the upper side die. However, the terminal carrier 36, maintaining linkage therewith only through linking portions 52 having a small width, is formed in one body together therewith and the different terminals 50 are mutually electrically conductive.

The terminal table 10 is fixed by suitable devices. Forward and backward bending of each terminal carrier 36 in transverse directions (along arrows A-B) around the linking portions 52 serving as a fulcrum is repeated forcibly. The thickness t of the linking portions is 0.2 mm and the width r thereof is 0.06 mm, as described previously. Thus, the deformation due to this repeated operation of forced bending exceeds the elastic limit and the linking portions 52 are broken by brittle fracture so that the terminals are cut away at their base. In this way the terminal carrier 36 is separated and the different terminals 50 are made independent from each other. A multi-pin connector 60 having insert terminals electrically isolated from each other can be fabricated in this way. Elements 58 represent fixing terminals, to which extremities of input/output leads of a circuit wiring are secured by soldering.

As explained above, in the method for fabricating a connector for an electronic circuit by terminal insert molding according to the present invention, outflow of resin material to be molded from the cavity is prevented by filling completely the open end of the slots. The slots in the parting plane of the die plate guide the hoops 34 at the end surfaces of the terminal carriers 36. It is possible to fabricate a multi-pin connector 60 by insert molding once, i.e. by one shot injection molding. Further, since no complicated lattice structure for partitioning a space into small parts for different terminals is required, owing to the fact that the parting plane of the die plate is completed by making the hoops 34 cooperate with the core 26, the construction of the die plate is extremely simple. In this way, it is possible to reduce cost for the dies.

In addition, since the two extremities of each of the slots 32 formed in the die plate to guide the hoop 34 are freely opened, the. hoop can move in the longitudinal direction. Therefore, it is possible to arbitrarily choose zigzag arrangements of terminals in the transverse direction without changing the construction of the die plate. Furthermore, owing to the freedom of the hoop 34 in the longitudinal direction, it is possible to extend the die so as to effect insert molding for a plurality of connectors at once. A plurality of hoops having terminals can be simultaneously and continuously supplied to a plurality of cavities in a connector terminal table die. Repeated continuous insert molding can be effected and thus it is possible to improve productivity.

What is claimed is:

1. A method for fabricating a connector for an electronic circuit by terminal insert molding, comprising:
   providing conductive band-shaped plates, each said plate including a terminal carrier that is cut away after insert molding along its longitudinal direction and a plurality of terminals extending; in a direction perpendicular to a side of the terminal carrier and arranged in parallel with each other;

providing a connector die having a cavity including a stripper plate having parallel slots formed in a parting plane thereof, the slots extending the entire length of the stripper plate and open on opposing ends of the stripper plate in the longitudinal direction, the slots having a width that is slightly greater than a thickness of said plates enabling the plates to be closely engaged within the slots, the table die including a lower side die;

aligning a terminal side end surface of the terminal carriers with the open ends of the slots on the parting plane and completely filling the slots with the terminal carriers, the parting plane defining a flat upper surface so the closed cavity is effectively shut by the parting plane;

advancing the conductive band-shaped plates through the slots in the longitudinal direction;

aligning a first set of terminals of the conductive band-shaped plates perpendicular to the upper surface of the cavity;

inserting simultaneously a plurality of the terminals in a vertical direction into the cavity and closing the die; and forming a connector.

2. The method for fabricating a connector for an electronic circuit by terminal insert molding according to claim 1, wherein the plurality of terminals are linked at the terminal side end surface with the terminal carrier through linkages that are easily broken by forced plastic deformation, the method including the step of bending the terminal carrier to break the terminal carrier from the terminals at the linkages after the insert molding of the terminals so that the terminals, which were linked with each other through the end surface of the terminal carrier are independent from each other.

3. The method for fabricating a connector for an electronic circuit by terminal insert molding according to claim 1, wherein the plurality of slots are engraved in said stripper plate and the plurality of band-shaped conductive plates are arranged so that a width direction of plate surfaces is vertical and the plates are parallel to each other at a predetermined interval, the slots being in parallel to receive the terminal carriers.

4. The method for fabricating a connector for an electronic circuit by terminal insert molding according to claim 3, wherein the band-shaped conductive plates arranged in parallel are located so that the terminals of each of the plates are shifted with respect to corresponding terminals of another of the plates adjacent thereto by a predetermined distance in the longitudinal direction so that a terminal arrangement having a zigzag pattern in a transverse direction is formed.

5. The method for fabricating a connector for an electronic circuit by terminal insert molding according to claim 3, wherein positioning holes are formed in the terminal carrier of each of the-band-shaped conductive plates.

6. The method for fabricating a connector for an electronic circuit by terminal insert molding according to claim 1, wherein each of the band-shaped conductive plates is 0.1 to 0.3 mm thick.

7. The method for fabricating a connector for an electronic circuit by terminal insert molding according to claim 6, wherein a width of linking portions of the linkages linking each of the terminals to the terminal side end surface of the terminal carrier is less than 0.1 mm.

8. The method for fabricating a connector for an electronic circuit by terminal insert molding according to claim 7, wherein the width of the linking portions is 0.06 mm.

9. The method for fabricating a connector for an electronic circuit by terminal insert molding according to claim 1, wherein for each of the band-shaped conductive plates a hoop is used, so that the plurality of terminals are formed by forward transfer continuous press.

10. A method for fabricating a connector for an electronic circuit by terminal insert molding, comprising:

providing band-shaped plates, each said plate comprising a terminal carrier and a plurality of elongate terminals extending in a direction perpendicular to a side of the terminal carrier, the terminals being arranged in parallel with each other;

providing a stripper plate having parallel slots formed in a parting plane thereof, the slots extending the entire length of the stripper plate and open on opposing ends of the stripper plate in a longitudinal direction, the slots having a width that is slightly greater than a thickness of said plates enabling the plates to be received within the slots;

providing a die for engagement with the stripper plate to define a cavity;

aligning a terminal side end surface of the terminal carriers with the open ends of the slots on the parting plane;

inserting the terminal carriers into the slots, the parting plane defining a flat upper surface so the opposing ends of the slots are effectively shut by the parting plane, the terminal carriers extending outwardly from the opposing ends of the slots;

advancing the band-shaped plates through the slots in the longitudinal direction;

aligning a first set of terminals of the band-shaped plates perpendicular to the cavity;

inserting simultaneously a plurality of the terminals into the cavity and closing the die; and forming a connector.

11. The method of claim 10, including the step of inserting a core into the cavity, the core having openings corresponding to the terminals projecting into the cavity.

12. The method of claim 10, including the step of bending the terminal carrier so that the terminals are separated therefrom.

13. The method of claim 12, wherein linkages connect the terminals to the terminal carriers, the linkages having a smaller width than the width of the terminal carriers and the terminals.

14. The method of claim 10, including the steps of:

opening the die;

advancing the band-shaped plate through the slots in the longitudinal direction;

aligning a second set of terminals of the band-shaped plates perpendicular to the cavity;

simultaneously inserting the second set of terminals in a vertical direction into the cavity and closing the die; and forming another connector by terminal insert molding.

15. The method of claim 14, including repeating the steps therein to form a plurality of connectors.

16. The method of claim 10, including the step of rearranging the position of the band-shaped plates in the slots in the longitudinal direction to change the pattern of the terminals within the cavity without requiring a differently shaped stripper plate.

* * * * *